(12) United States Patent
Lee et al.

(10) Patent No.: US 12,730,498 B2
(45) Date of Patent: Sep. 8, 2026

(54) METHOD AND APPARATUS FOR SUPPORTING INTERACTION BETWEEN VIRTUAL ENVIRONMENT AND REAL WORLD

(71) Applicant: SEOUL NATIONAL UNIVERSITY R&DB FOUNDATION, Seoul (KR)

(72) Inventors: Youngki Lee, Seoul (KR); Hyuna Seo, Seoul (KR); Juheon Yi, Seoul (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 0 days.

(21) Appl. No.: 18/932,857

(22) Filed: Oct. 31, 2024

(65) Prior Publication Data

US 2025/0383703 A1 Dec. 18, 2025

(30) Foreign Application Priority Data

Jun. 13, 2024 (KR) ........................ 10-2024-0077055

(51) Int. Cl.
*G06F 3/01* (2006.01)
*G06T 11/00* (2006.01)

(52) U.S. Cl.
CPC .............. *G06F 3/011* (2013.01); *G06T 11/00* (2013.01)

(58) Field of Classification Search
CPC ...... G06F 3/011; G06F 3/017; G06F 3/04815; G06T 11/00; G06T 19/006; G06T 19/20
See application file for complete search history.

(56) References Cited

U.S. PATENT DOCUMENTS 10,675,766 B1 6/2020 Niemeyer et al.
2011/0205242 A1* 8/2011 Friesen ................ A43B 3/0078 345/633
2012/0306853 A1 12/2012 Wright et al.
2016/0140763 A1* 5/2016 Seichter ............. G06F 3/04812 345/633
2017/0336863 A1 11/2017 Tilton et al.
2018/0158243 A1 6/2018 Gleason et al.
2019/0089898 A1 3/2019 Kim et al.
(Continued)

FOREIGN PATENT DOCUMENTS

KR 10-2014-0038442 A 3/2014
KR 10-1830793 B1 2/2018
(Continued)

OTHER PUBLICATIONS

Kohei Kanamori et al., "Obstacle Avoidance Method in Real Space for Virtual Reality Immersion," 2018 IEEE International Symposium on Mixed and Augmented Reality (ISMAR), DOI: 10.1109/ISMAR.2018.00033, pp. 80-89, Oct. 2018, Germany.
(Continued)

*Primary Examiner* — Sahlu Okebato
(74) *Attorney, Agent, or Firm* — Bridgeway IP Law Group, PLLC; Jihun Kim

(57) ABSTRACT

Proposed are an apparatus and method for supporting interaction between a virtual environment and the real world. According to an embodiment disclosed herein, there is provided an electronic apparatus including: memory; and a controller configured to determine an interaction state for a
(Continued)

physical object in the real world and provide a virtual environment according to a blending technique selected based on determination results.

18 Claims, 8 Drawing Sheets

(56) References Cited

U.S. PATENT DOCUMENTS

| | | | | |
|---|---|---|---|---|
| 2019/0391647 | A1 | 12/2019 | Rihn et al. | |
| 2021/0227178 | A1 | 7/2021 | Lyon et al. | |
| 2023/0394773 | A1 | 12/2023 | Blechschmidt et al. | |
| 2023/0410378 | A1* | 12/2023 | Karmi | G06V 40/174 |
| 2024/0036640 | A1* | 2/2024 | Zhang | G06F 3/015 |
| 2024/0289975 | A1* | 8/2024 | Viehauser | G06F 3/011 |

FOREIGN PATENT DOCUMENTS

| | | | |
|---|---|---|---|
| KR | 10-1872000 | B1 | 6/2018 |
| KR | 10-2020-0000803 | A | 1/2020 |
| KR | 10-2282297 | B1 | 7/2021 |
| KR | 10-2434402 | B1 | 8/2022 |

OTHER PUBLICATIONS

Jeremy Hartmann et al., "RealityCheck: Blending Virtual Environments with Situated Physical Reality," CHI '19: Proceedings of the 2019 CHI Conference on Human Factors in Computing Systems, Paper No. 347, pp. 1-12, https://doi.org/10.1145/3290605.3300577, May 2, 2019, US.

David Lindlbauer et al., "Context-Aware Online Adaptation of Mixed Reality Interfaces," UIST '19: Proceedings of the 32nd Annual ACM Symposium on User Interface Software and Technology, pp. 147-160, https://doi.org/10.1145/3332165.3347945, Oct. 17, 2019, US.

Hyuna Seo et al., "LIVE: life-immersive virtual environment with physical interaction-aware adaptive blending," MobiSys '22: Proceedings of the 20th Annual International Conference on Mobile Systems, Applications and Services, pp. 531-532, https://doi.org/10.1145/3498361.3538769, Jun. 27, 2022, US.

Charcos Llorens V, "European Search Report for EP Application No. 24211098", Apr. 7, 2025, EPO, Germany.

Suhyun Lee, "Designing Life-Immersive Physical Interaction in Mixed Reality Environment," Master's thesis in engineering, Seoul National University Graduate School, Aug. 2021.

* cited by examiner

TARGET OBJECT : PERCEIVE STATE → APPROACH STATE → MANIPULATE STATE (SIMPLE, COMPLEX)

NON-TARGET OBJECT : PERCEIVE STATE → AVOID STATE

METHOD AND APPARATUS FOR SUPPORTING INTERACTION BETWEEN VIRTUAL ENVIRONMENT AND REAL WORLD

CROSS-REFERENCE TO RELATED APPLICATION

This application claims the benefit of Korean Patent Application No. 10-2024-0077055 filed on Jun. 13, 2024, which is hereby incorporated by reference herein in its entirety.

BACKGROUND

1. Technical Field

The embodiments disclosed herein relate to a method and apparatus for supporting interaction between a virtual environment and the real world, and more particularly, to a method and apparatus for supporting an interactive state-adaptive virtual-reality blending technique that enables interaction with a physical object within a virtual reality.

The embodiments disclosed herein were derived as a result of the research on the task "Artificial Intelligence Graduate School Program (Seoul National University)" (task management number: IITP-2021-0-01343) of the Information, Communications and Broadcasting Innovative Talent Nurturing Project that was sponsored by the Korean Ministry of Science and ICT and the Institute of Information & Communications Technology Planning & Evaluation.

The embodiments disclosed herein were derived as a result of the research on the task "Hyper-realistic Pervasive Hybrid Telepresence" (task management number: NRF-2022R1A2C3008495) of the Individual Basic Research Project that was sponsored by the Korean Ministry of Science and ICT and the National Research Foundation of Korea.

2. Description of the Related Art

Virtual reality (VR) allows users to experience a virtual environment by creating an illusion that they are personally in a virtual space. Users can easily experience a virtual environment through electronic apparatuses such as a head-mounted display (HMD) or smart glasses.

In addition, electronic apparatuses that have been recently popularized also support blending between virtuality and reality. However, these virtual reality systems support blending between virtuality and reality by using a technique that replaces a real-world object with a virtual object and renders it in a virtual environment or a technique that projects a camera view, showing the real world, onto a virtual environment. However, these two schemes have problems in that serious degradation is caused in usability and immersion. In other words, there are problems in that the frequent transition between virtuality and reality reduces a user's immersion and errors (e.g., a collision during the movement of an object, and groping multiple times to grab an object) often occur during interactions with physical objects because it is not easy to recognize physical objects located in the real world.

Therefore, there is a demand for a new level of function that overcomes the above-described problems and improves the interaction between a virtual environment and the real world.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

An object of the embodiments disclosed herein is to propose a method and apparatus for supporting interaction between a virtual environment and the real world.

An object of the embodiments disclosed herein is to support the smooth transition between a virtual environment and a physical environment of the real world.

An object of the embodiments disclosed herein is to provide the gradual transition between the virtual and real worlds and a customized virtuality-reality blending technique based on an interaction state.

An object of the embodiments disclosed herein is to continuously maintain presence and usability even when the interaction state between a user and a physical object continuously changes.

An object of the embodiments disclosed herein is to support the complex interaction with a physical object in the real world while maintaining a balance between the usability of interaction with a physical object located in the real world and the immersion in a virtual environment.

An object of the embodiments disclosed herein is to provide physical world information required for each interaction state while maintaining a balance between presence and usability.

According to an aspect of the present invention, there is provided an electronic apparatus for supporting interaction between a virtual environment and the real world, the electronic apparatus including: memory; and a controller configured to determine an interaction state for a physical object in the real world and provide a virtual environment according to a blending technique selected based on determination results.

According to another aspect of the present invention, there is provided a method of supporting interaction between a virtual environment and the real world, the method being performed by an electronic apparatus, the method including: determining an interaction state for a physical object in the real world; and providing a virtual environment according to a blending technique selected based on determination results.

According to still another aspect of the present invention, there is provided a non-transitory computer-readable storage medium having stored thereon a program that, when executed by a processor, causes the processor to execute a method of supporting interaction between a virtual environment and the real world. The method includes: determining an interaction state for a physical object in the real world; and providing a virtual environment according to a blending technique selected based on determination results.

According to still another aspect of the present invention, there is provided a computer program that is executed by an electronic apparatus and stored in a non-transitory computer-readable storage medium to perform a method of supporting interaction between a virtual environment and the real world. The method includes: determining an interaction state for a physical object in the real world; and providing a virtual environment according to a blending technique selected based on determination results.

According to some of the above-described solutions, there may be proposed the method and apparatus for supporting interaction between a virtual environment and the real world.

According to some of the above-described solutions, there may be supported the smooth transition between a virtual environment and a physical environment of the real world. Through this, gradual reality may be provided. Furthermore, the gradual interaction with a real object in a virtual environment is enabled.

According to some of the above-described solutions, there may be provided the gradual transition between the virtual and real worlds and a customized virtuality-reality blending technique based on an interaction state, so that a user can naturally interact with a physical object located in the real world in a virtual environment. This significantly improves the user's virtual reality experience.

According to some of the above-described solutions, there may be continuously maintained presence and usability at a high level even when the interaction state between a user and a physical object continuously changes.

According to some of the above-described solutions, there may be maintained a balance between the usability of interaction with a physical object located in the real world and the immersion in a virtual environment, and also, there may be supported the complex interaction with a physical object in the real world.

According to some of the above-described solutions, there may be maintained a balance between presence and usability, and also there may be provided physical world information required for each interaction state. Through this, improved cross-reality experiences may be provided.

The advantages that can be achieved by the embodiments disclosed herein are not limited to the advantages described above, and other advantages not described above will be clearly understood by those having ordinary skill in the art, to which the embodiments disclosed herein pertain, from the foregoing description.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figures 1, 2:
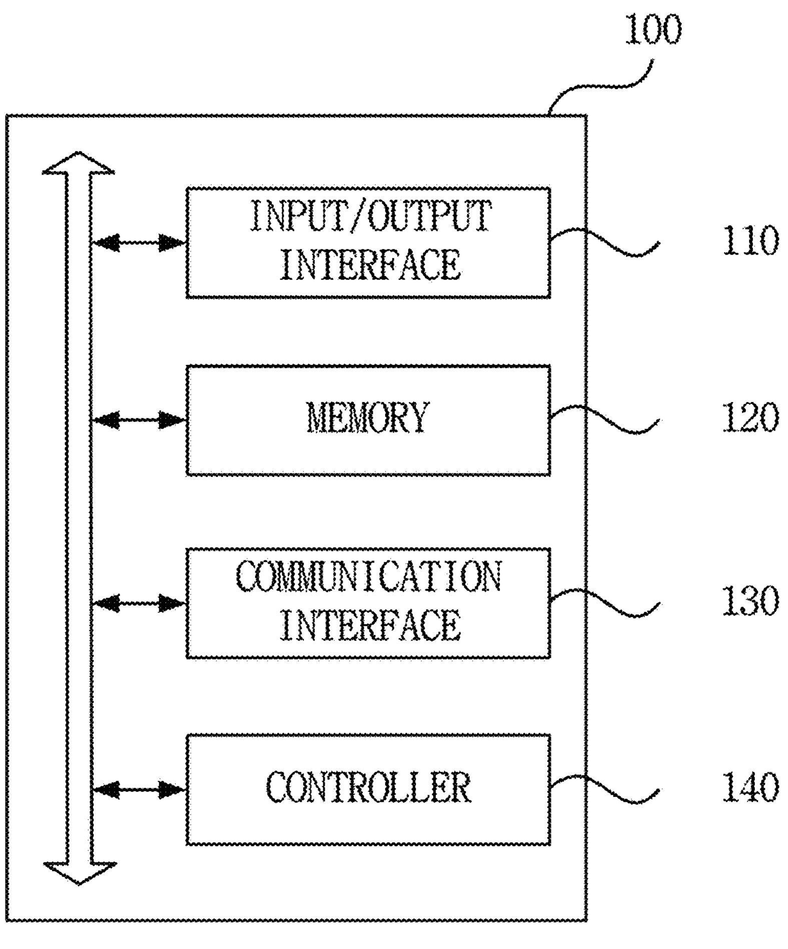
FIG. 1 is a block diagram showing an apparatus for supporting interaction between a virtual environment and the real world according to an embodiment.
FIGS. 2 to 8 are exemplary diagrams illustrating an apparatus for supporting interaction between a virtual environment and the real world according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

Embodiments will be described in detail below with reference to the accompanying drawings.

Meanwhile, prior to the following description, the meanings of the terms to be used below will be defined first.

Each physical object in the real world may be distinguished as a combination of (i) a 'primitive shape,' (ii) a 'grasping area,' (iii) a 'manipulating area,' and (iv) others. The relationship between each area of the physical object and its affordance is defined as follows.

The 'primitive shape' refers to the simplest geometric representation of the physical object. For example, the primitive shape may include cubes, cylinders, spheres, and cones (e.g., a cylinder for a bottle, a sphere for a basketball, and a cube for a box). The area corresponding to the primitive shape of an object represents the largest volume of the object, and facilitates affordances including contain, wrap-grasp, and support.

The 'grasping area' refers to the outer region of the primitive shape of the object designed for effective grasping, such as a handle, a knob, a pistol, or a bar. The grasping area also supports other affordances (e.g., moving, and lifting) that can be achieved through accurate grasping.

The 'manipulating area' includes regions related to affordances for simple manipulations such as opening, pouring, pushing, pulling, and pressing. For example, the manipulating area may include the mouth of a coke can, a hole in a weight plate, the cover and lid of a water jug, and the pistol of a sprayer.

Others, excluding (i) the primitive shape, (ii) the grasping area, and (iii) the manipulating area, refer to regions that are not related to affordances and interactions, such as the decorations of the object (e.g., the rabbit ears of a home camera cover).

Every physical object necessarily has a primitive shape, but may not have a region that can be grasped or manipulated. That is, there may be no grasping area or manipulating area. For example, a simple paper cup and a basketball may have neither a grasping area nor a manipulating area, a mug may have only a grasping area, a can may have only a manipulating area, while a water bottle may have all the components of a primitive shape, a grasping area, and a manipulating area. According an embodiment disclosed herein, the affordance may include affordances addressed by 3D AffordanceNet (e.g., containing, wrap-grasping, grabbing, supporting, grasping, moving, lifting, opening, pulling, pushing, pressing, and pouring).

In addition to the terms defined above, terms requiring descriptions will be descried separately below.

FIG. 1 is a block diagram showing an apparatus for supporting interaction between a virtual environment and the real world according to an embodiment, and FIGS. 2 to

8 are exemplary diagrams illustrating an apparatus for supporting interaction between a virtual environment and the real world.

The apparatus for supporting interaction between a virtual environment and the real world may be implemented as an electronic apparatus 100. That is, the electronic apparatus 100 may support interaction between a virtual environment and the real world. The electronic apparatus 100 may include a user terminal, or may include a user terminal and a server. For example, the electronic apparatus 100 may implement a method according to an embodiment disclosed herein as a user terminal, or may implement the method as a server-client system.

In this case, according to an embodiment, the user terminal may be implemented as a computer, a mobile terminal, a television, a wearable device, or the like that can access a remote server or connect with another terminal and a server over a network. In this case, the computer includes, for example, a notebook, a desktop, a laptop, and the like each equipped with a web browser. The mobile terminal is, for example, a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type that can be directly worn on a human body, such as a watch, glasses, an accessory, clothing, shoes, or the like, and can access a remote server or connect with another terminal directly or via another information processing device over a network.

The electronic apparatus 100 may obtain tracking data on movement such as a change in a user's position, a change in the movement of a user's hand or finger, a change in the position of a physical object, and the movement of a physical object from an external device while communicating with the external device.

That is, the electronic apparatus 100 may obtain tracking data that is obtained by tracking the movement of at least one of a user, a user's hand, and an object according to various embodiments. That is, 'tracking data' refers to data that is obtained by tracking the movement of an object or a user (or a user's hand or finger), such as the position of an object in actual reality, the movement according to the movement of an object, the position of a user's hand, the movement of a user's hand or finger, or the like. As described above, the electronic apparatus 100 may obtain data on the movement of the user's hand and/or data on the movement of the object detected by an external device as tracking data, and may also obtain tracking data through an input/output interface such as a sensor and a camera mounted inside the electronic apparatus 100.

According to an embodiment, the electronic apparatus 100 is implemented as a server-client system, and the user terminal included in the electronic apparatus 100 may be a wearable device and may be implemented as a head-mounted display (HMD) that displays a virtual environment image to a user and changes the image according to the user's movement. The user terminal may be provided with a built-in/attached camera, and may obtain a camera view image showing the real world and communicate with ac server. Furthermore, the electronic apparatus 100 may communicate with at least one sensor device. The sensor device may be, for example, a sensor for tracking the position or movement of the user's hand, and may be a depth camera, a depth and motion sensing camera, a three-dimensional (3D) motion control device, and/or the like. The depth and motion sensing camera is a device that detects the depth and movement of a subject, and may be, for example, 'Zed Mini camera.' The 3D motion control device is a device that detects the movement of the user's hand and finger, and may be, for example, 'Leap Motion Controller.' Furthermore, the electronic apparatus 100 may communicate with a tracker (6DoF tracker) that is attached to the user's body or an object, tracks the movement of the user or object in real time and obtains information about the movement, and may communicate with, for example, 'VIVE tracker 3.0'. Examples in which the electronic apparatus 100 obtains tracking data are not limited to those described above, and the electronic apparatus 100 may obtain tracking data according to known techniques.

As described above, the electronic apparatus 100 may analyze the distance between the user and the object, the distance between the user's hand and the object, or the distance between a plurality of objects by using the obtained tracking data, and may monitor the activation of the virtual button. For example, the electronic apparatus 100 may analyze the distance between the hand and the object using the difference between the position of the hand and the position of the object extracted from the tracking data, or may detect the movement of the finger from the tracking data and monitor whether the finger has clicked the virtual button.

The electronic apparatus 100 may track the interaction between the user and the object, the interaction between the user's hand and the object, or the interaction status between the objects by using the tracking data. For convenience of description below, the distance in the 'distance between the user and the object' refers to the distance between the object and at least one of the user's body, the user's hand, the user's specific finger, and the user's head.

Referring to FIG. 1, the electronic apparatus 100 according to an embodiment may include an input/output interface 110, memory 120, a communication interface 130, and a controller 140.

The input/output interface 110 may include an input interface configured to receive input from a user and an output interface configured to display information such as the result of the performance of a task or the status of the electronic apparatus 100. For example, the input/output interface 110 may include an operation panel configured to receive user input and a display panel configured to display screens.

More specifically, the input interface may include devices capable of receiving various types of user input such as a keyboard, physical buttons, a touch screen, a camera, and/or a microphone. Furthermore, the output interface may include a display panel, and/or a speaker. However, the input/output interface 110 is not limited thereto, and may include components capable of supporting various types of input/output.

According to an embodiment, when the electronic apparatus 100 is implemented as an HMD and is mounted on the user's head, the input/output interface 110 may sense a changed position when the user's three-dimensional position (or the user's head position) changes according to the movement of the user's head or body, and may receive the user's position change information as an input value. Alternatively, according to an embodiment, when the electronic apparatus 100 is implemented as an HMD and is mounted on the user's head, the input/output interface 110 may be implemented as a camera and receive a camera view of the real world as an input value.

Various types of data such as a file, an application, and a program may be installed and stored in the memory 120. The controller 140 may access and use the data stored in the memory 120, or may store new data in the memory 120. Furthermore, the controller 140 may execute a program installed in the memory 120. Referring to FIG. 1, a program for performing a method of supporting interaction between a virtual environment and the real world may be installed in the memory 120.

According to an embodiment, when an input requesting the start of a program is received from a user through the input/output interface 110, the controller 140 may execute the program stored in the memory 120 and perform a method of supporting interaction between a virtual environment and the real world.

The communication interface 130 may perform wired/wireless communication with another device or a network. To this end, the communication interface 130 may include a communication module configured to support at least one of various wired/wireless communication methods. For example, the communication module may be implemented in the form of a chipset.

The wireless communication supported by the communication interface 130 may be, for example, Wireless Fidelity (Wi-Fi), Wi-Fi Direct, Bluetooth, Ultra-Wide Band (UWB), or Near Field Communication (NFC). Furthermore, the wired communication supported by the communication interface 130 may be, for example, Universal Serial Bus (USB), or High Definition Multimedia Interface (HDMI).

According to an embodiment, the communication interface 130 may communicate with an external device (not shown) that provides tracking data, and may obtain tracking data from the external device (not shown) and provide it to the controller 140.

The controller 140 may control the overall operation of the electronic apparatus 100, and may include a processor such as a central processing unit (CPU) or a graphics processing unit (GPU). The controller 140 may control other components included in the electronic apparatus 100 to perform operations corresponding to the user input received through the input/output interface 110.

For example, the controller 140 may execute a program stored in the memory 120, may read a file stored in the memory 120, and may store a new file in the memory 120.

The controller 140 may provide a virtual environment image in which a virtual object corresponding to at least some of the physical objects located in the real world is rendered. For example, the controller 140 may implement a virtual environment so that each of the physical objects located in the real world corresponds to each of the virtual objects located in a virtual environment. The controller 140 may render and provide the virtual environment according to a 'perceive state' among the interaction states to be described below.

According to an embodiment, the controller 140 may determine an interaction state for the physical object in the real world, and may provide a virtual environment rendered according to a blending method selected based on determination results.

The controller 140 may track the interaction state for the object and apply a unique blending technique to each of the physical objects. For example, the controller 140 may track the interaction state between objects, or the interaction state between the user and the object, or the interaction state between the user's hand and the object, and may provide a rendered virtual environment by applying a blending technique corresponding to the interaction state to the virtual object corresponding to the object.

To this end, the controller 140 may classify each of the physical objects included in the real-world image as a 'target object' for which interaction with the user occurs and a 'non-target object' for which interaction with the user does not occur. The controller 140 improves usability by applying a blending technique to such a target object, and maintains presence by minimizing a blending technique for such a non-target object.

The controller 140 may classify the physical interaction state between the user and the object. According to an embodiment, the controller 140 may determine the interaction state for the object. In this case, the interaction state may be one of a perceive state, an approach state, a manipulate state, and an avoid state. The individual interaction states will be described in more detail below.

The controller 140 may determine the type of physical object. When an object in question is a target object, the controller 140 may select any one of the perceive state, the approach state, and the manipulate state. In contrast, when an object in question is a non-target object, the controller 140 may select any one of the perceive state and the avoid state. In this case, according to an embodiment, the controller 140 may determine that an object other than the physical object determined to be a target object is a non-target object. For example, when a user extends his/her hand, it may be determined that an object located in the direction in which the hand is directed is a target object. Alternatively, the movement of the pupil of the user's eye may be tracked, and an object at which the user is looking may be determined to be a target object based on the direction in which the user gazes.

FIG. 2 shows the flow of an interaction state between each target object and each non-target object.

As shown in FIG. 2, for a target object, classification may be made into one of the 'perceive state,' 'approach state,' and 'manipulate state.' In this case, the user's need for detailed information about the physical object is bound to increase in the order of the perceive state, the approach state, and the manipulate state. In contrast, the controller 140 may classify a non-target object, which does not interact with the user but whose presence needs to be recognized in the virtual environment, as one of the 'perceive state' and the 'avoid state.' In this case, the 'avoid state' improves the user's recognition of surrounding objects, enabling safe and efficient exploration in the virtual environment, especially while manipulating the target object. In connection with this, as shown in FIG. 2, the controller 140 may determine the non-target object to be in the avoid state when the non-target object is determined to be in the perceive state and then the target object is determined to be in the manipulate state.

Meanwhile, according to an embodiment, the controller 140 may determine an interaction state for an object. In this case, the interaction state may be one of the perceive state, the approach state, the manipulate state, and the avoid state.

Among the interaction states, the 'perceive state' means that a user identifies the virtual object of a physical object in a virtual environment. Unlike the physical world (the real world) where physical objects are immediately perceived, the virtual environment is asynchronous with the physical world, and thus, the controller 140 may provide a physical object with it matched to a virtual object in the virtual environment. Through this, the user may be deeply immersed in the virtual experience, may easily identify a corresponding physical object through a virtual object, and may enable natural and intuitive interaction with the physical object.

According to an embodiment, the controller 140 may determine that an interaction state in question is a 'perceive state' when the movement of the user's hand (or finger) is not detected. In this case, the controller 140 may identify a physical object from a camera view image acquired by capturing the real world by using a known image extraction technique, may select an image corresponding to the identified object, and may render it as a virtual object. A technology for arranging a virtual object, onto which a physical object is projected, in a virtual environment and rendering it may be a known technology. For example, when a campground is implemented as a virtual environment, a desk located in front of a user wearing an electronic apparatus 100 and objects placed on the desk may be implemented as virtual objects and rendered into the virtual environment.

Among the interaction states, the 'approach state' is a state in which the user's movement to touch a physical object is detected, and may be, for example, a state in which the user extends his/her hand to grab a physical object. In order to ensure high usability, the controller 140 may provide a grasping area in a region of a virtual object corresponding to the physical object. When the approach state is identified in this manner, the controller 140 may provide a grasping area, thereby balancing the need for usability support for maintaining existence and the provision of related physical world information (e.g., the grasping area).

The controller 140 may determine that an interaction in question is an approach state based on the movement of the user or the movement of the user's hand. Furthermore, it may be determined that an interaction in question is an approach state when the distance between the user and the physical object becomes closer or the distance between the user's hand and the physical object becomes closer based on the movement of the user (or the user's hand). Furthermore, the controller 140 may determine that an interaction state in question is an approaching state when the distance from the physical object to the user or the user's hand is smaller than a predetermined value and equal to or larger than another threshold. In this case, when the distance is determined to be smaller than the threshold, it may be determined that an interaction in question is a manipulate state to be described below.

According to an embodiment, the controller 140 may identify a grasping area in a physical object and then generate a grasping area for a virtual object corresponding to the identified region in order to support the user's safe grab for the physical object.

Among the interaction states, the 'manipulate state' refers to a state in which the user manipulates a target object that the user has grabbed, and the nature of the manipulation may vary depending on the user's purpose, the characteristics of a target object, and the situation surrounding the target object in a virtual environment. This manipulate state may be divided into a 'simple manipulate state' and a 'complex manipulate state.' The controller 140 may determine whether the interaction state for the physical object is a simple manipulate state or a complex manipulate state out of the manipulate states. In connection with this, the 'simple manipulate state' refers to an interaction state related to less complex physical object processing compared to the complex manipulate state. For example, a state that can be processed only by displaying the primitive shape of an object and the grasping area of an object may be determined to be a simple manipulate state. In contrast, the 'complex manipulate state' refers to a state related to a change in the state of a physical object itself, and may include, for example, a situation related to a change in the state of an object, such as a change in the liquid level in a bottle.

The controller 140 may determine an interaction state in question to be a manipulate state when it is determined that the user has gripped a target object, or may determine an interaction state in question to be a manipulate state when the distance between the user's hand and a physical object is closer than a predetermined threshold. According to an embodiment, when the controller 140 determines an interaction state in question to be a manipulate state, it may additionally determine whether the manipulate state is a simple manipulate state or a complex manipulate state. When a change in the state of the physical object is detected, the manipulate state may be determined to be a simple manipulate state. In contrast, all other cases may be determined to be in a simple manipulate state. According to another embodiment, the controller 140 may determine whether an interaction state in question is a simple manipulate state or a complex manipulate state without determining whether it is a manipulate state. In the same manner, when a change in the state of the physical object is detected, the manipulate state may be determined to be a simple manipulate state. In contrast, all other cases may be determined to be in a simple manipulate state.

Among the interaction states, the 'avoid state' is a state for a non-target object, and refers to a state that is activated when the user needs to avoid a non-target object near a target object while manipulating the target object that the user has held. In this case, the non-target object requires relatively simple information (e.g., a location, or a boundary) compared to the target object that the user interacts with, so that it is processed in a different flow from the interaction flow for the target object. That is, the controller 140 distinguishes between a target object and a non-target object. As shown in FIG. 2, when the 'manipulate state' is triggered for the target object, the avoid state may be triggered for the non-target object. When the controller 140 determines the target object to be in a manipulate state, it may determine that a non-target object located within a predetermined radius from the target object is in an avoid state. A Boundary Box blending technique may be applied to the non-target object that is determined to be in an avoid state. This may avoid collision with a non-target object while maintaining high-level presence, allowing the user to effectively explore the environment.

According to an embodiment, the controller 140 may determine the interaction state for a physical object, may select a blending technique based on determination results, and may provide a rendered virtual environment based on the selected blending technique.

According to an embodiment, the controller 140 may select various blending techniques. In this case, such a blending technique may be at least one of Virtual Proxy, Affordance Contour, Pass-Through, and Boundary Box.

Figure 3:
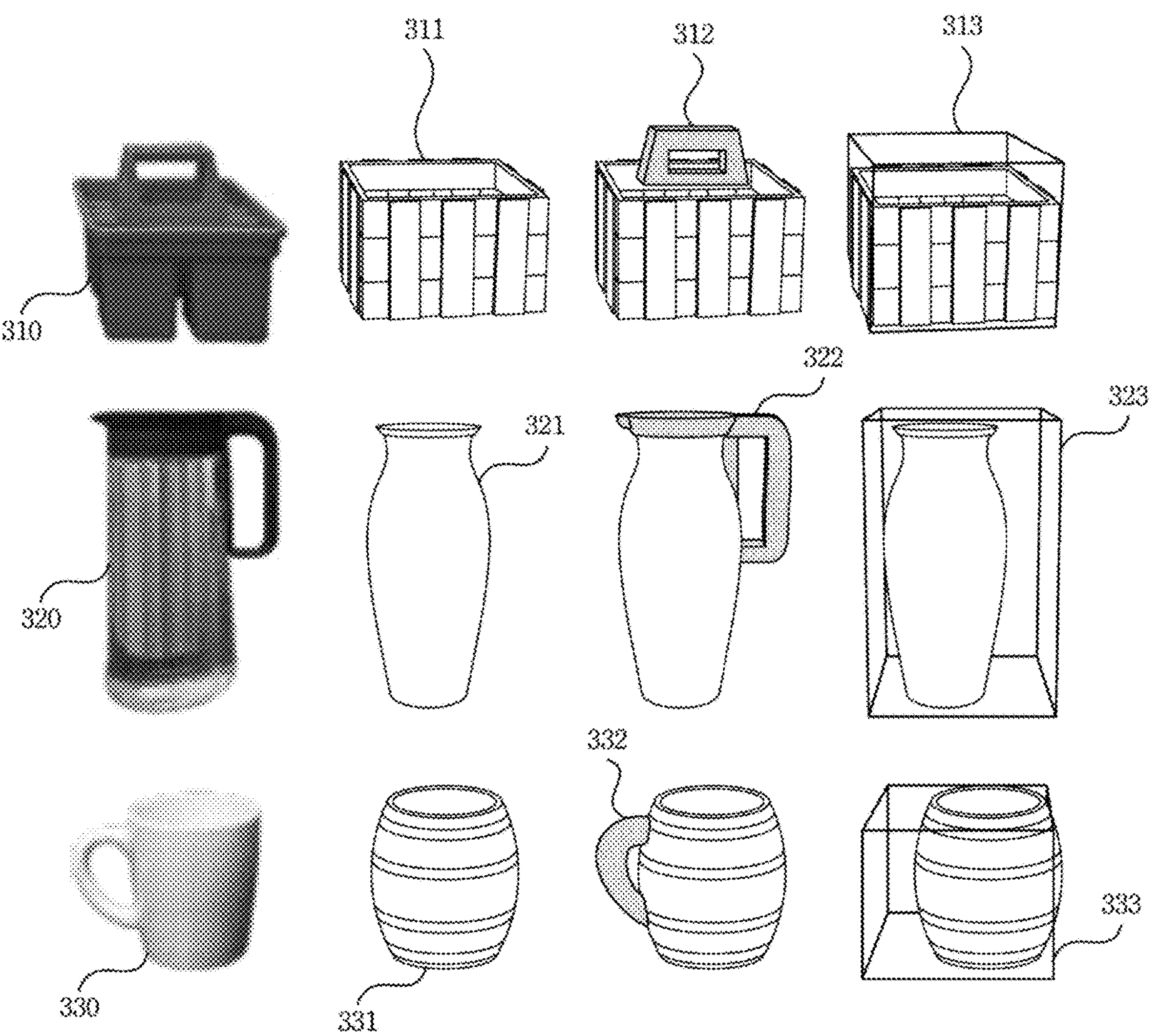

In connection with this, FIG. 3 is an exemplary diagram illustrating a blending technique. In this drawing, each of a organizer box 310, a water jug 320, and a cup 330, which are physical objects, may be rendered as virtual objects 311, 312 and 313, 321, 322 and 323, or 331, 332 and 333 in a virtual environment with the blending technique applied thereto.

The 'Virtual Proxy' technique generates virtual representations of physical objects as a blending technique while complying with two main requirements: i) thematic consistency with the virtual environment, and ii) similarity in geometry and affordance within the domain of primitive shapes. For example, a physical bottle of hand cream, given its cylindrical container and containment function, may be rendered as a cylindrical container of motor oil in a virtual environment implemented as a virtual house. Thematic consistency plays an important role in enhancing the presence of an object in the virtual environment. For example, in a VR Space House scenario, physical objects on a desk should be represented as Virtual Proxies that align with a virtual space theme, such as robots or electrical components. Accordingly, when the virtual space theme is a VR space house, the physical objects should be represented as virtual proxies that align with the virtual space theme, such as robots or electronic components, rather than objects that conflict with the theme, such as a virtual antique box or a camping lantern. To this end, the controller 140 may select an object corresponding to a physical object from among the virtual objects preset for the virtual space theme. Furthermore, in order to implement the Virtual Proxy technique, the controller 140 may mirror the geometry and affordance of the physical object corresponding to the virtual object. For example, rendering a real-world fan as a large virtual toy car may confuse the user, and conversely, using a virtual proxy that accurately represents the shape of a physical object (e.g., an object reconstructed in 3D) supports interaction with the user, but it prevents the design of a diverse and immersive virtual environment. Accordingly, in order to achieve a balance between high presence, usability, and creative design, an appropriate level of similarity between a physical object and a virtual proxy corresponding to the physical object needs to be taken into consideration, and the controller 140 may select and map a virtual proxy having the same type of primitive shape (e.g., a cylinder, or a cube), size, and affordance (e.g., contain, or drink) as the physical object. When rendering a virtual object implemented as a virtual proxy in a virtual environment, the controller 140 may apply a virtual proxy having the same size as the primitive shape of the physical object. Furthermore, the controller 140 may provide a virtual object having the same affordance type as the physical object. The Virtual Proxy technique is a basic blending technique that integrates a physical object into a virtual environment, and facilitates state recognition. The Virtual Proxy technique may convey basic information such as the type and location of the physical object represented as a virtual object in a scene while providing a high level of realism to the user. According to an embodiment, the Virtual Proxy blending technique disclosed herein may be implemented in the same manner as a known Virtual Proxy technique supporting blending between virtuality and reality.

In connection with this, for example, the controller 140 may analyze the primitive shape, size, and affordance of a physical object. This may be classified as one of six primitive shapes: a sphere, a cylinder, a cone, a cube, a pyramid, and a torus. The controller 140 may measure the size and primitive shape area of the physical object, and may then select a virtual proxy that best matches the physical object in terms of shape and affordance. That is, the controller 140 may process the physical object as the Virtual Proxy. Accordingly, as shown in FIG. 3, the organizer box 310, the water jug 320, and the cup 330, which are physical objects, may be virtualized into a wooden box 311, a flower vase 321, and a barrel cup 331, i.e., virtual objects, that can be present in a VR campground, which is the theme of the virtual environment, and may thus be rendered in the virtual environment. In this case, an object excluding an area for grabbing or manipulating the corresponding object may be rendered. In this manner, the controller 140 may apply a virtual proxy that matches the physical object in terms of primitive shape, size, and affordance through the Virtual Proxy technique. As described below, when access to or manipulation of the object is required, a grasping area or manipulating area for grabbing or manipulating the object may be provided according to the Affordance Contour technique.

Meanwhile, the 'Affordance Contour' technique supports interaction in the approach state and the simple manipulate state as a blending technique. That is, when an interaction state in question is any one of the approach state and the simple manipulate state, the controller 140 may overlay an affordance contour on an object for which a physical object has been processed into a virtual proxy. That is, overlaying an affordance contour means overlaying a grasping area and a manipulating area on an object processed into a virtual proxy. The 'grasping area' indicates a location (e.g., a handle, a knob, or a bar) where people intuitively grasp an object, and the 'manipulating area' relates to the orientation of a physical object and an interactable part (e.g., an opening, a lid, or a button). The controller 140 may visually process the graphing or manipulating arca on the object processed into the virtual proxy by overlaying an affordance contour on the object processed into the virtual proxy. When an interaction state in question is determined to be an approach state (or a manipulate state), the controller 140 may apply the Affordance Contour technique. The controller 140 may guide the user through 'where to reach out and grab' by displaying the 3D outlines of grasping and manipulating areas for an object displayed through the Virtual Proxy technique as an Affordance Contour technique. For example, the controller 140 may generate a mesh model with Blender, and may generate one of a handle, a cover, a straw, a hole, a button, a gun, and a lid for a physical object in a scenario. According to an embodiment, the controller 140 may measure the relative positions of grasping and manipulating areas on a virtual object based on information about a physical object obtained through a tracker attached to the physical object, and may map the grasping or manipulating arca to the virtual object implemented as a virtual proxy through mapping to the measured positions. For example, as shown in FIG. 3, there may be provided virtual objects in which grasping areas 312, 322, and 332 are visually displayed by applying affordance contours to virtual objects 311, 321, and 321 displayed using the Virtual Proxy technique. Since simple interactions with everyday objects (e.g., opening, pulling, pushing, drinking, pouring, moving, lifting, and pressing) do not require detailed examinations of the shapes of the objects, implementing an affordance contour in a simple manipulate state reduces the dependence on Pass-Through, and thus provides an optimal sense of realism that is better than that in the case of entirely applying the Pass-Through technique in a manipulate state.

In order to simplify user interaction and reduce cognitive load, the controller 140 may automate the triggering of Affordance Contour during the frequent interactions of the approach state and the simple manipulate state. That is, the controller 140 may overlay an affordance contour on a virtual object corresponding to a physical object when the distance between the physical object and the user is closer than a predetermined value, and may deactivate the applied Affordance Contour overlay when the distance is equal to or farther than the predetermined value. For example, the controller 140 may trigger Affordance Contour when a physical object is located within a predetermined radius from the user's hand so that Affordance Contour is applied to a virtual object, and may deactivate Affordance Contour when the hand is located outside the predetermined radius or moves away from the physical object so that a smooth and immersive user experience is provided.

Furthermore, the controller 140 may display a virtual button for activating the pass-through, which will be described later, by applying the Affordance Contour blending technique in the approach state or the manipulate state.

As a blending technique, 'Pass-Through' may be activated in a 'complex manipulate state' where the accurate representation of a target object is required. In other words, Pass-Through is used only in a complex manipulate state where observation or detailed information about the deformation of a physical object is required, and a possible Affordance Contour is used. Pass-through allows the actual appearance of an object in the real world to be seen directly in a virtual environment. Accordingly, for example, the Pass-Through technique may be applied in a scenario of pouring water into a cup in a VR campground or a scenario of opening a can of cola in a VR movie theater. In this case, the controller 140 enables a physical camera view of a physical object to be displayed through the smallest ellipsoid shape, including a virtual object, in order to reduce presence loss. For example, the controller 140 may search for an RGB frame constituting a real-world image in real time, may crop the smallest ellipsoid surrounding a target physical object from the RGB frame, and may overlay the cropped image on a corresponding Virtual Proxy.

The controller 140 may trigger the Pass-Through blending technique in response to the user's request or automatically. For example, the user may activate the pass-through by pressing the virtual button displayed through the Affordance Contour blending technique. For example, when the user's hand approaches an object, a virtual button may be displayed on a virtual object, and the pass-through may be applied when the user performs a gesture of pressing the virtual button. Furthermore, for example, when the user's hand is located outside a predetermined radius from the area where the Pass-Through technique is applied for a preset period of time in the state in which the Pass-Through technique has been applied, the pass-through may be automatically deactivated to terminate the interaction.

As a blending technique, 'Boundary Box' is a technique applied in the avoid state among the interaction states. The controller 140 may apply the Boundary Box blending technique by overlaying the smallest cube surrounding a virtual proxy for a non-target object to which the Boundary Box blending technique will be applied. That is, the controller 140 surrounds the non-target object using the smallest possible translucent box, thereby allowing the user to easily avoid the non-target object acting as an obstacle while maintaining the presence of the non-target object. That is, the controller 140 may apply the Boundary Box technique by generating and overlaying the smallest cube surrounding the non-target object on the virtual proxy for the non-target object located around the target object. In this case, the controller 140 may generate boundary box lines according to a known embodiment and apply a translucent material to the cube by using the same color as the lines. As shown in FIG. 3, the boundary boxes 313, 323, and 333 surrounding the virtual proxies 311, 321, and 331 corresponding to the organizer box 310, the water jug 320, and the cup 330, which are physical objects, may be applied, respectively. In this case, in order to display more natural boundary boxes, boundary boxes may be generated to surround the virtual objects 312, 322, and 332 based on Affordance Contoured virtual objects according to an embodiment. A non-target object represented by a boundary box may provide information about the boundaries of the non-target object, thereby supporting a user to extend his/her hand to a target object without colliding with a protruding decoration of the non-target object. This indicates that another physical object around the target object is located close to it, thereby enhancing the user's sense of immersion. When the controller 140 determines that the user moves a target object near a non-target object, for example, when it determines that a non-target object is located within a predetermined radius from a target object, the controller 140 may triggers the Boundary Box blending technique for the non-target object to automatically render a boundary box for the non-target object. When the target object moves away from the non-target object to which the Boundary Box blending technique has been applied, the controller 140 may terminate the application of the Boundary Box blending technique.

As described above, the controller 140 may determine the interaction state based on at least one of (i) the user's position (or the position of the user's hand), (ii) the position of a physical object, and (iii) the pressed state of a virtual button, and may select and trigger a blending technique based on determination results. For example, when the controller 140 determines that the distance between the user's hand and a target physical object is closer than a predetermined value (e.g., 12 cm), it may determine the interaction state in question to be an approach state and a simple manipulate state and trigger Affordance Contour. At the same time, the controller 140 may display a virtual button on a virtual proxy (or a virtual object). Whenever the user presses the virtual button, the controller 140 may determine the interaction state in question to be a complex manipulate state and trigger the pass-through. The controller 140 may terminate the pass-through when the user's hand is outside a pass-through area for a specified period of time (e.g., 3 seconds). Furthermore, the controller 140 may measure the distance between the target object and the non-target object when the target object moves during the manipulate state. When the measured distance is closer than a predetermined threshold (e.g., 15 cm), the controller 140 may determine that the nearby non-target object is in an avoid state, and may render a boundary box for the non-target object.

FIGS. 4 to 8 are intended to describe how a blending technique is applied based on each interaction state when a VR campground is provided as a virtual environment.

Figure 4:
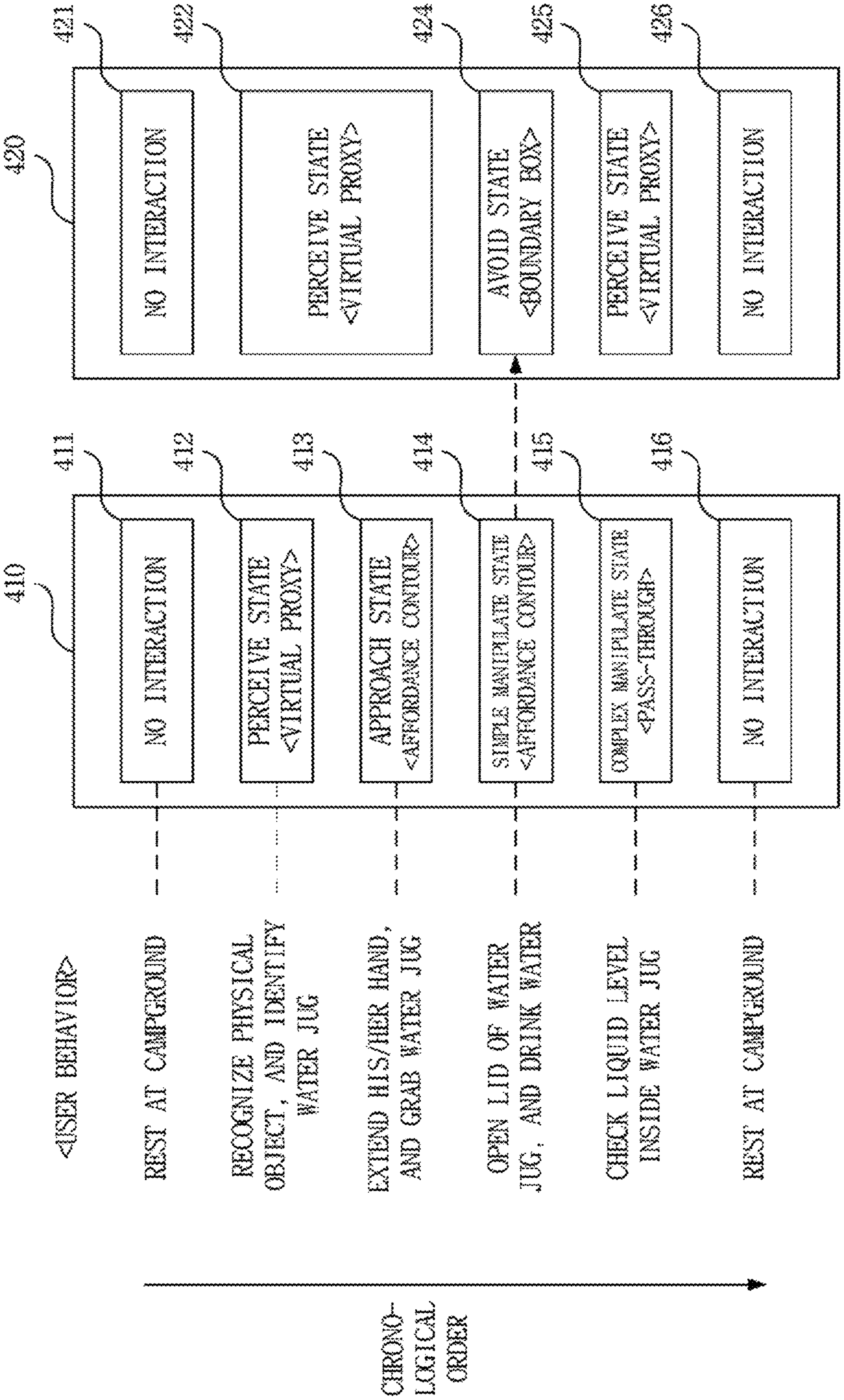

In connection with this, FIG. 4 is an example of interacting with a single target object. In FIG. 4, a user's current task (user behavior) is described over time. Furthermore, FIG. 4 shows a blending technique 410 applied to a target object and a blending technique 420 applied to a non-target object according to respective user behaviors.

As shown in FIG. 4, when the user is resting at a campground, the controller 140 may render and display a virtual environment, and may thus determine that there is no interaction 411, or 421 for each of a target object and a non-target object. Since there is no interaction, the controller 140 does not apply any blending technique.

Thereafter, when it is determined that the user recognizes a physical object and identifies a water jug, an interaction state in question is a perceive state. For example, when the controller 140 acquires a camera view image, it determines that an interaction state in question is a perceive state. The controller 140 may determine a target object to be in a perceive state 412 and apply the Virtual Proxy technique, and may also determine a non-target object to be in a perceive state 422 and apply the Virtual Proxy technique in the same manner. The controller 140 may, for example, process a water jug in the real world into a virtual proxy (e.g., a virtual flower vase) whose shape and affordance match. In this case, when it is determined that the user extends his/her hand to grab the water jug, the controller 140 may determine the target object to be in an approach state 413 and apply Affordance Contour. However, the non-target object is still in the perceive state, and thus the Virtual Proxy technique may be applied thereto. When the user opens the cap of the water jug that he/she grabs and drinks water, i.e., when the user opens the cap of the water jug, the controller 140 may determine that the user is grabbing the water jug and determine a corresponding interaction state for the target object to be a simple manipulate state 414, and may apply Affordance Contour that marks a handle or cap (a grasping or manipulating arca) helpful for grabbing and manipulating the water jug. In this case, the recognition of a non-target object near the target object needs to be improved during the process of grabbing the water jug, and thus, the controller 140 may determine the non-target object to be in an avoid state 424 and apply a boundary box to the non-target object. Thereafter, when it is determined that the user brings the water jug that he/she is grabbing closer and checks the amount of liquid in the water jug, the controller 140 may determine a corresponding interaction state to be a complex manipulate state 415 and apply a Pass-Through technique to check the liquid in the physical water jug. In this case, the user's distance from the non-target object has become far, so that the interaction state of the non-target object is changed to the perceive state 425, and accordingly, the Virtual Proxy technique may be applied to the non-target object. Thereafter, when the user does not move his/her body or hand, it is determined that the user is resting again at the campground, and the controller 140 may determine that there is no corresponding interaction state 416 or 426 because there is no interaction.

Figure 5:
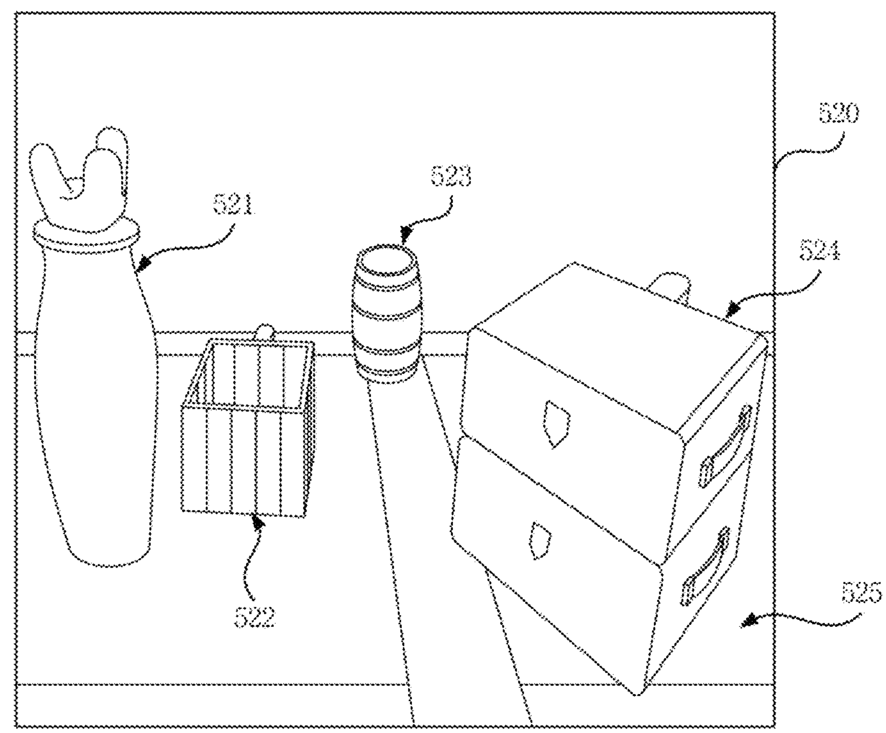
Figure 5:
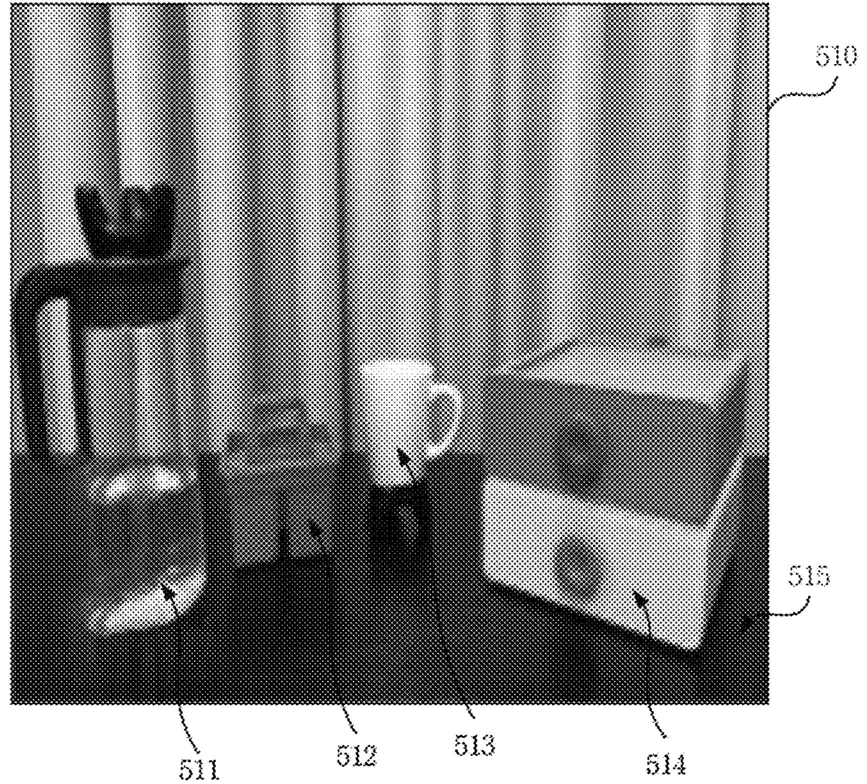
Figure 6:
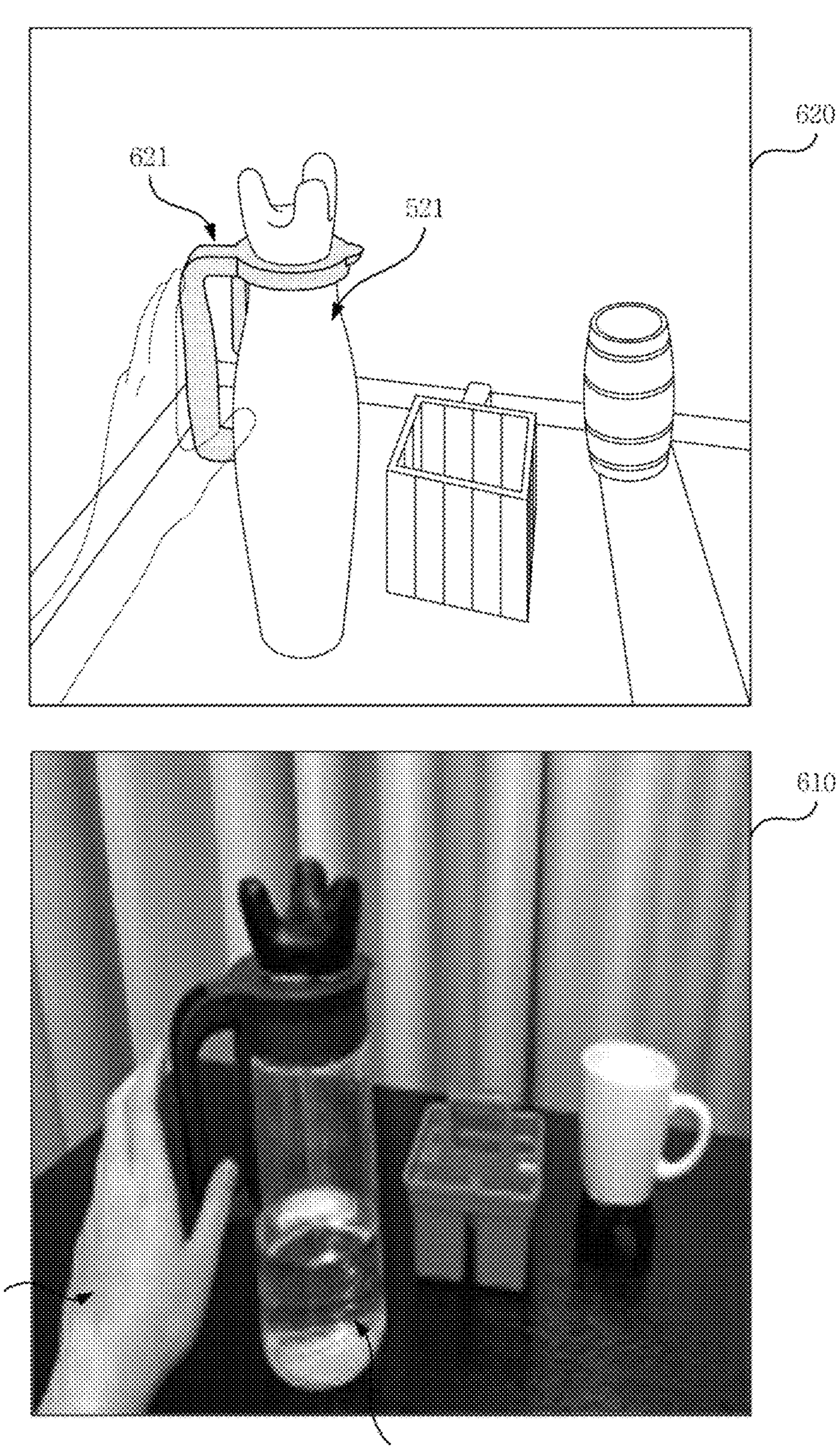
Figure 7:
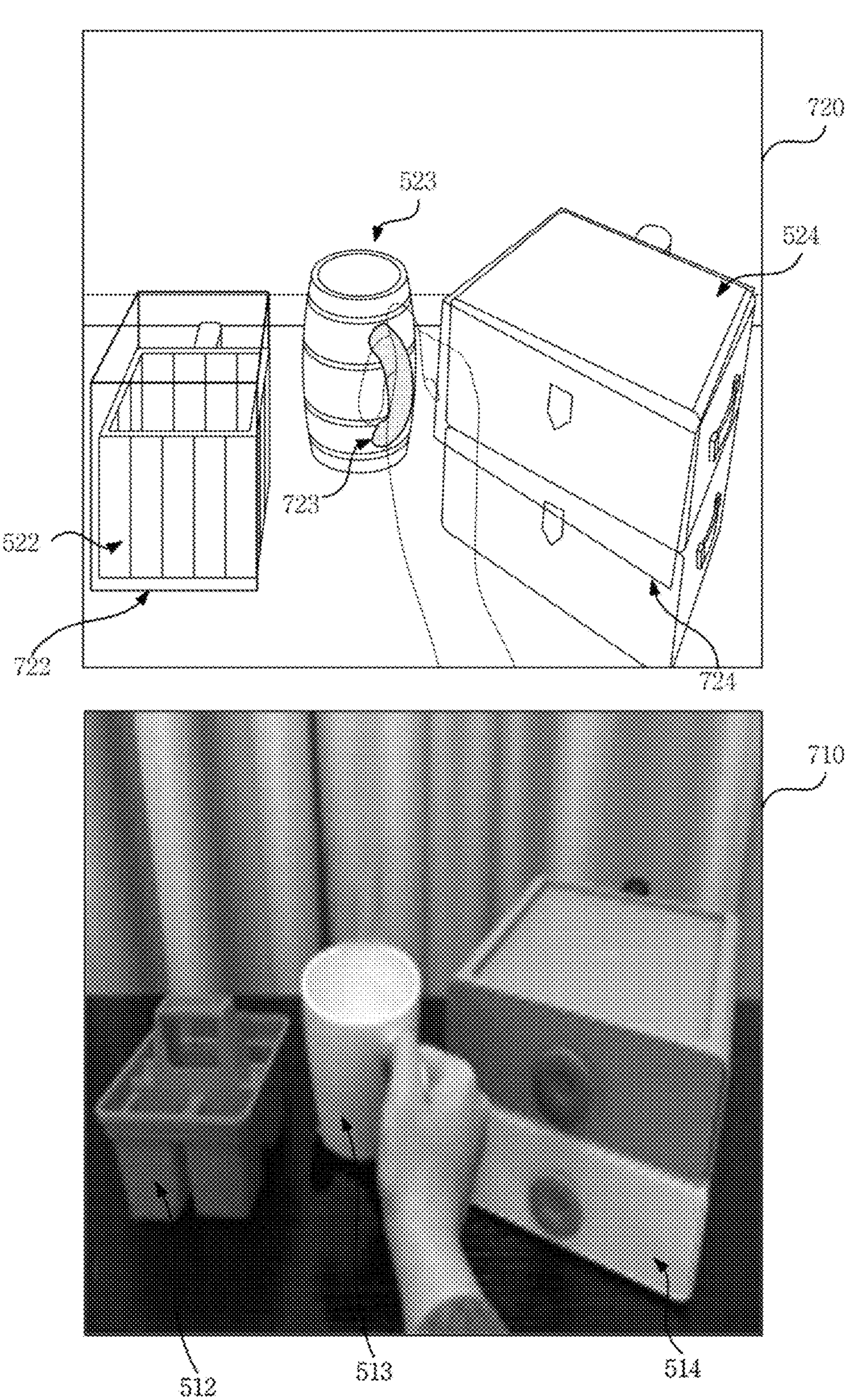
Figure 8:
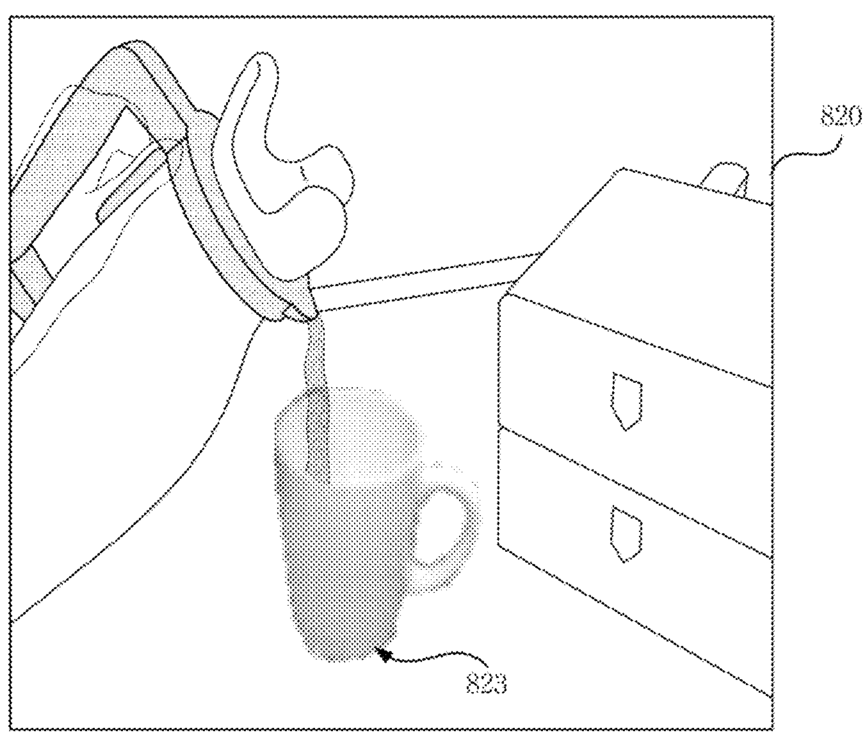
Figure 8:
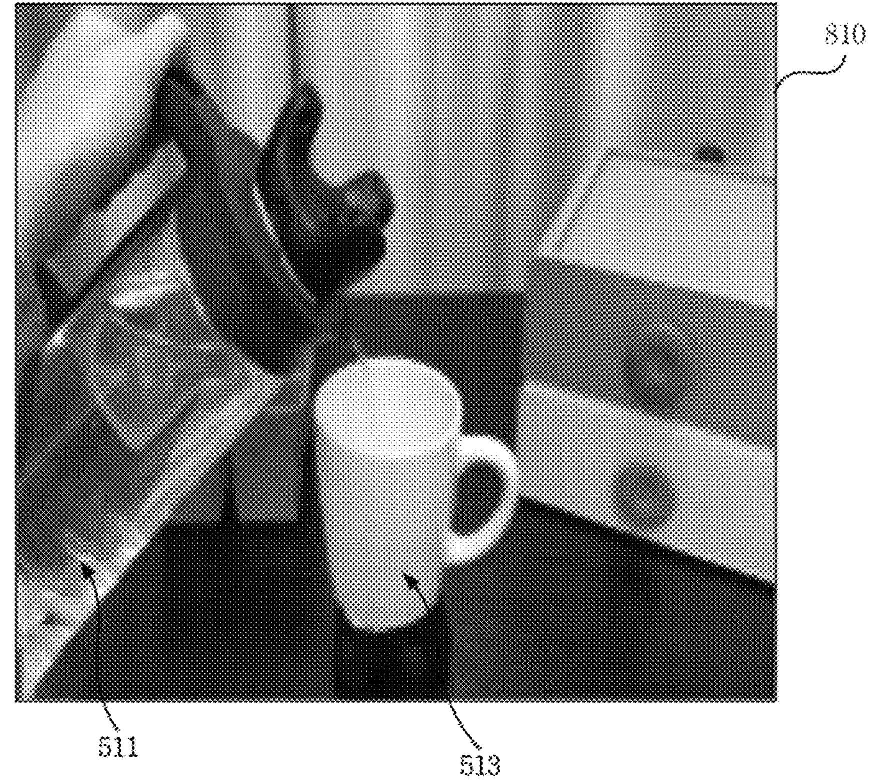

Meanwhile, FIGS. 5 to 8 illustrate virtual environments 520, 620, 720, and 820 provided based on real-world images 510, 610, 710, and 810 acquired through a camera mounted on an HMD when a user wears the HMD in which an electronic apparatus according to the apparatus disclosed herein is implemented. The virtual environments 520, 620, 720, and 820 illustrate examples of virtual environments that appear through the screen of the HMD in which the apparatus disclosed herein is implemented. FIG. 5 is a diagram illustrating a perceive state among interaction states, FIG. 6 is a diagram illustrating an approach state among interaction states, FIG. 7 is a diagram illustrating a manipulate state among interaction states, and FIG. 8 is a diagram illustrating an avoid state among interaction states.

According to an embodiment, a perceive state may be provided as a default. Accordingly, a physical object may be blended into a virtual environment as a virtual proxy so that the user may recognize its presence. For example, when it is determined that a situation in which physical objects are placed in front of a user is identified through a camera, i.e., when a real-world image 510 is acquired by capturing a situation in which a water jug 511, an organizer box 512, a cup 513, and a drawer 514 are positioned on a desk 515, as shown in FIG. 5, the controller 140 may render and display the individual physical objects 511, 512, 513, 512, 514, and 515 in the rendered virtual environment 520. For this purpose, the Virtual Proxy blending technique may be applied to generate virtual objects 521, 522, 523, 524, and 525 corresponding to respective physical objects and render and display them in the virtual environment. Through this, the user may identify the virtual objects corresponding to the physical objects in the real world. That is, when the interaction state is a perceive state, the controller 140 may support the user to recognize the presence of physical objects by integrating the physical objects into the virtual environment using virtual proxies (virtual representations reflecting the shapes, sizes, and functions of the physical objects therein). In this case, the controller 140 may overlay the virtual proxies in accordance with the theme of the virtual environment. Accordingly, the water jug 511, the organizer box 512, the cup 513, the drawer 514, and the desk 515 may be rendered as a flower vase 521, a wooden box 522, a barrel cup 523, a camping storage box 524, and a camping table 525, respectively.

During the provision of the virtual environment image 520, when it is determined that the user extends his/her hand and grabs the water jug, i.e., when the controller 140 determines that the distance from the user's hand to the water jug, which is a physical object, is within a predetermined range, the controller 140 may determine that the water jug, which is a target object, is in an approach state among the interaction states. It is obvious that it may be determined that the non-target object is still in the perceive state. The real-world image 610 of FIG. 6 is a real-world image that is displayed as the user, who was provided with the real-world image 510 of FIG. 5, approaches the water jug 511. When the controller 140 determines that the distance between the user's hand U and the water jug 511 is within a predetermined range, it may provide a virtual environment 620 in which a handle 621 is rendered on the flower vase 521 by applying the Affordance Contour blending technique, as shown in FIG. 6. Through this, visual guidance to an interactive portion may be performed. In this case, the controller 140 may determine the position and shape of the handle 621 by analyzing the real-world image 610 so that the handle 621 of the flower vase 521 corresponds to the shape of the handle of the water jug 511. As described above, by performing visual support through the Affordance Contour blending technique, the user may perform simple manipulation such as accurately grabbing and moving a physical object.

During the provision of the virtual environment image 620, when the user turns his/her head, extends his/her hand while looking at the cup 513, grabs the cup 513 and then lifts the cup upward (i.e., in a direction perpendicular to the table), i.e., when a real-world image 710 is acquired, as shown in FIG. 7, the controller 140 may apply the blending techniques of Affordance Contour and Boundary Box to the virtual object. That is, when the user extends his/her hand to the cup 513, the controller 140 determines the cup 513 to be in an approach state, and applies Affordance Contour to the barrel cup 523 corresponding to the cup 513 to render a handle 723 on the barrel cup 523, thereby providing the virtual environment 720. Furthermore, when the user grabs the cup 513, the controller 140 may determine the cup 513 to be in a simple manipulate state and apply Affordance Contour to the barrel cup 523 corresponding to the cup 513 to render the handle 723 on the barrel cup 523, thereby providing the virtual environment 720. In this case, the cup 513 is a target object, and thus, the organizer box 512 and the drawer 514 located on both sides of the cup 513 become non-target objects. When the distance between the target object and the non-target object is within a predetermined distance, the controller 140 may determine the non-target object to be in an avoid state and apply a Boundary Box blending technique to the non-target object. That is, as shown in FIG. 7, the controller 140 may provide the virtual environment 720 by rendering a boundary box 722 for the wooden box 522 corresponding to the organizer box 512 and also rendering a boundary box 724 for the camping storage box 524 corresponding to the drawer 514.

Thereafter, when the user moves the cup 513, located behind a position between the organizer box 512 and the drawer 514, to a position in front of the position between the organizer box 512 and the drawer 514 and then it is determined by detecting the user's movement that the water jug 511 grabbed in the user's left hand is tilted and the water contained in the water jug 511 is poured into the cup, as shown in the real-world image 810 of FIG. 8, the controller 140 may determine the cup 513, which is a target object containing water, to be in a complex manipulate state and apply the Pass-Through technique to the barrel cup corresponding to the cup 513. Accordingly, the controller 140 may provide the virtual environment 820 by rendering a cup 823 in which the cup 513 in the real world is projected at a location corresponding to the barrel cup or by cropping the cup 513 in the real world and inserting it at a location corresponding to the barrel cup. Accordingly, the user may check the liquid level when water is filled in the cup 513 located in the physical world, which enables the precise recognition of the target object. According to an embodiment, the user may activate a Pass-Through mode by clicking a button or the like. For example, as in the example above, when the user clicks a virtual button generated by the Affordance Contour technique for an object having a complex or dynamically changing shape, such as a wine glass or food plate that is used to pour liquid thereinto or is easy to break, the Pass-Through mode may be activated.

As described above, the apparatus according to the embodiment disclosed herein may support a user to perform necessary interaction with an object in the real world while supporting the user to have a high level of immersion in a virtual environment, thereby improving the quality of the user's virtual reality experience.

Figure 9:
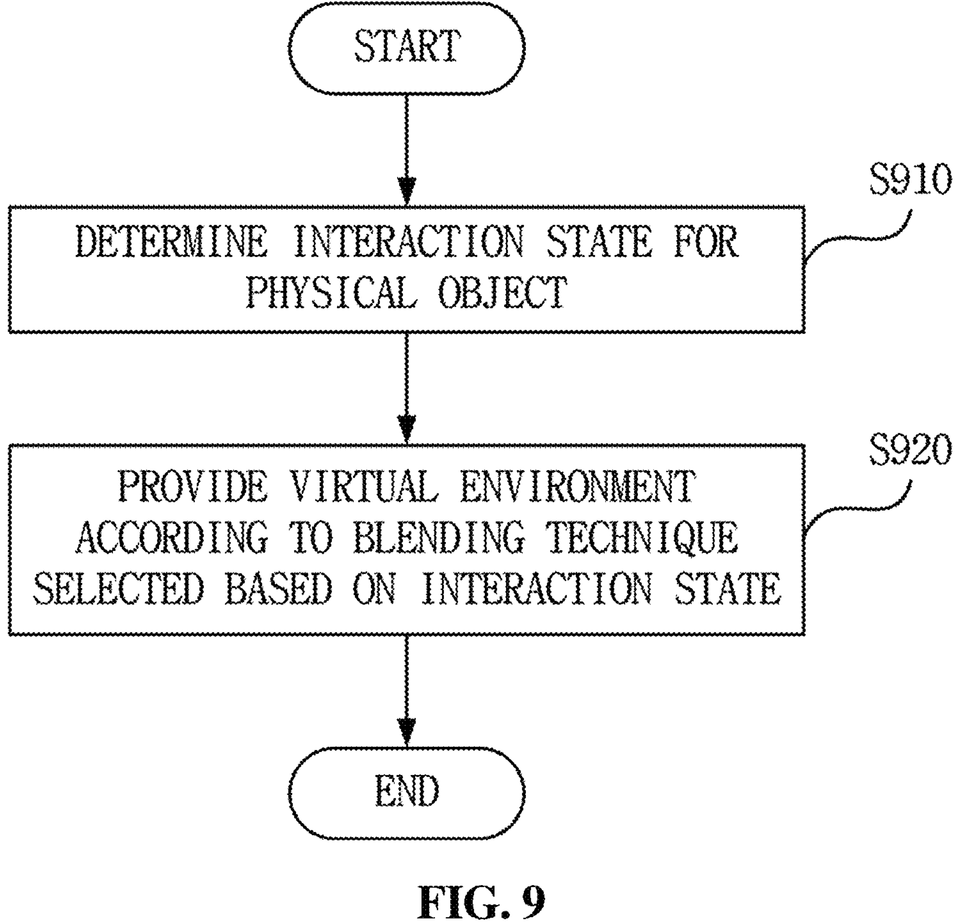
FIG. 9 is a flowchart illustrating a method of supporting interaction between a virtual environment and the real world according to an embodiment.

FIG. 9 is a flowchart illustrating a method of supporting interaction between a virtual environment and the real world according to an embodiment.

The method according to the embodiment shown in FIG. 9 includes the steps that are processed in a time-series manner by the apparatus shown in FIGS. 1 to 8. Accordingly, the descriptions that are omitted below but have been given above in conjunction with the apparatus shown in FIGS. 1 to 8 may also be applied to the method according to the embodiment shown in FIG. 9.

As shown in FIG. 9, the apparatus 100 may determine an interaction state for a physical object in the real world in step S910.

For example, the apparatus 100 may determine the type of physical object, and may select one of a perceive state, an approach state, and a manipulate state when the object is a target object and select one of a perceive state and an avoid state when the object is a non-target object.

Furthermore, for example, the apparatus 100 may determine whether the interaction state for the physical object is a simple manipulate state or a complex manipulate state among the detailed states of the manipulate state.

Furthermore, for example, when the apparatus 100 determines a physical object to be in a manipulate state, it may determine that a non-target object located within a predetermined radius from the physical object is in an avoid state.

Thereafter, the apparatus 100 may render and provide a virtual environment according to the blending technique selected based on the interaction state in step S920.

For example, the apparatus 100 may render a virtual environment by applying one of Virtual Proxy, Affordance Contour, Pass-Through, and Boundary Box.

For example, when the interaction state is one of the approach state and the simple manipulate state, the apparatus 100 may overlay an affordance contour on an object for which a physical object has been processed into a virtual proxy.

Furthermore, for example, the apparatus 100 may overlay an affordance contour on an object for which a physical object has been processed into a virtual proxy, and may visually process a grasping or manipulating area on the object processed into the virtual proxy.

Furthermore, for example, the apparatus 100 may overlay an affordance contour on a virtual object corresponding to a physical object when the distance between the physical object and the user is closer than a predetermined value, and may deactivate the affordance contour overlay if the distance is farther than the predetermined value.

Furthermore, for example, the apparatus 100 may apply a boundary box to a non-target object determined to be in an avoid state.

In this manner, the method disclosed herein may divide physical object interactions in a virtual environment into four states (i.e., perceive, approach, manipulate, and avoid states) and dynamically apply various blending techniques. Furthermore, new blending techniques (i.e., Affordance Contour, and Boundary Box) are designed, so that it may be possible to accurately grasp an object and maintain high presence while avoiding an obstacle. Moreover, physical objects may be classified into a target object and a non-target object, and then different blending techniques may be applied according to classification results.

Unlike conventional methods that focus only on simple interactions (e.g., typing on a keyboard, and holding a water cup) or use simple virtual-reality blending techniques (e.g., always apply a Pass-Through technique to all interactions), the embodiments disclosed herein may propose an 'interaction state-adaptive virtual-reality blending technique' that gradually integrates information about the real world into a virtual environment according to various interaction states.

Usually, presence and usability are in a trade-off relationship. However, according to the embodiment disclosed herein, both presence and usability may be improved.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more central processing units (CPUs) in a device or secure multimedia card.

The method according to the embodiment described in conjunction with FIG. 9 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method according to the embodiment described in conjunction with FIG. 9 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method according to the embodiment described in conjunction with FIG. 9 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. An electronic apparatus for supporting interaction between a virtual environment and a real world, the electronic apparatus comprising:

a memory; and a controller configured to determine an interaction state for at least one physical object among a plurality of physical objects in a real world and provide a virtual environment according to a blending technique selected based on determination results, wherein the controller is configured to determine the interaction state by tracking a movement of at least one of a user, a user's hand, and an object, and by tracking at least one of (i) an interaction between the user and the object, (ii) an interaction between the user's hand and the object, and (iii) an interaction between a plurality of objects, and wherein the controller is configured to:

analyze at least one of a distance between the user and the object, a distance between the user's hand and the object, and a distance between the plurality of objects;

classify the plurality of physical objects into a target object with which the user interacts and a non-target object with which the user does not interact;

set an interaction state flow for the target object and an interaction state flow for the non-target object differently; and determine an avoid state, which is a state activated when the user needs to avoid the non-target object near the target object, based on a distance between the target object and the non-target object.

2. The electronic apparatus of claim 1, wherein the controller determines a type of the at least one physical object, and selects one of a perceive state, an approach state and a manipulate state when the at least one physical object is the target object and selects one of the perceive state and the avoid state when the at least one physical object is the non-target object.

3. The electronic apparatus of claim 1, wherein the controller determines whether the interaction state for the at least one physical object is a simple manipulate state or a complex manipulate state among detailed states of manipulate states.

4. The electronic apparatus of claim 1, wherein the blending technique is any one of Virtual Proxy, Affordance Contour, Pass-Through, and Boundary Box.

5. The electronic apparatus of claim 1, wherein the controller overlays an affordance contour on an object for which the at least one physical object has been processed into a virtual proxy when the interaction state is one of an approach state and a simple manipulate state.

6. The electronic apparatus of claim 1, wherein the controller overlays an affordance contour on an object for which the at least one physical object has been processed into a virtual proxy, and visually processes a grasping or manipulating area on the object processed into the virtual proxy.

7. The electronic apparatus of claim 1, wherein the controller overlays an affordance contour on a virtual object corresponding to the at least one physical object when a distance between the at least one physical object and a user is closer than a predetermined value, and deactivates the affordance contour overlay when the distance is equal to or farther than the predetermined value.

8. The electronic apparatus of claim 1, wherein the controller determines the non-target object, located within a predetermined radius from the at least one physical object, to be in the avoid state when it is determined that the at least one physical object is in a manipulate state.

9. The electronic apparatus of claim 8, wherein the controller applies a boundary box to the non-target object that is determined to be in the avoid state.

10. A method of supporting interaction between a virtual environment and a real world, the method being performed by an electronic apparatus, the method comprising:

determining an interaction state for at least one physical object among a plurality of physical objects in a real world; and providing a virtual environment according to a blending technique selected based on determination results, wherein the interaction state is determined by tracking a movement of at least one of a user, a user's hand, and an object, and by tracking at least one of (i) an interaction between the user and the object, (ii) an interaction between the user's hand and the object, and (iii) an interaction between a plurality of objects, and wherein determining the interaction state comprises:

analyzing at least one of a distance between the user and the object, a distance between the user's hand and the object, and a distance between the plurality of objects;

classifying the plurality of physical objects into a target object with which the user interacts and a non-target object with which the user does not interact;

setting an interaction state flow for the target object and an interaction state flow for the non-target object differently; and determining an avoid state, which is a state activated when the user needs to avoid the non-target object near the target object, based on a distance between the target object and the non-target object.

11. The method of claim 10, wherein determining the interaction state comprises:

determining a type of the at least one physical object; and selecting one of a perceive state, an approach state and a manipulate state when the at least one physical object is the target object, and selecting one of the perceive state and the avoid state when the at least one physical object is the non-target object.

12. The method of claim 10, wherein determining the interaction state comprises determining whether the interaction state for the at least one physical object is a simple manipulate state or a complex manipulate state among detailed states of manipulate states.

13. The method of claim 10, wherein providing the virtual environment comprises overlaying an affordance contour on an object for which the at least one physical object has been processed into a virtual proxy when the interaction state is one of an approach state and a simple manipulate state.

14. The method of claim 10, wherein providing the virtual environment comprises:

overlaying an affordance contour on an object for which the at least one physical object has been processed into a virtual proxy; and visually processing a grasping or manipulating area on the object processed into the virtual proxy.

15. The method of claim 10, wherein providing the virtual environment comprises:

overlaying an affordance contour on a virtual object corresponding to the at least one physical object when a distance between the at least one physical object and a user is closer than a predetermined value; and deactivating the affordance contour overlay when the distance is equal to or farther than the predetermined value.

16. The method of claim 10, wherein determining the interaction state comprises determining the non-target object, located within a predetermined radius from the at least one physical object, to be in an avoid state when it is determined that the at least one physical object is in a manipulate state.

17. The method of claim 16, wherein providing the virtual environment comprises applying a boundary box to the non-target object that is determined to be in the avoid state.

18. A non-transitory computer-readable storage medium having stored thereon a program that, when executed by a processor, causes the processor to execute a method of supporting interaction between a virtual environment and a real world, the method being performed by an electronic apparatus, the method comprising:

determining an interaction state for at least one physical object among a plurality of physical objects in a real world; and providing a virtual environment according to a blending technique selected based on determination results, wherein the interaction state is determined by tracking a movement of at least one of a user, a user's hand, and an object, and by tracking at least one of (i) an interaction between the user and the object, (ii) an interaction between the user's hand and the object, and (iii) an interaction between a plurality of objects, and wherein determining the interaction state comprises:

analyzing at least one of a distance between the user and the object, a distance between the user's hand and the object, and a distance between the plurality of objects;

classifying the plurality of physical objects into a target object with which the user interacts and a non-target object with which the user does not interact;

setting an interaction state flow for the target object and an interaction state flow for the non-target object differently; and determining an avoid state, which is a state activated when the user needs to avoid the non-target object near the target object, based on a distance between the target object and the non-target object.

* * * * *